(12) United States Patent
Uchida

(10) Patent No.: US 6,738,913 B1
(45) Date of Patent: May 18, 2004

(54) STORAGE DEVICE AND ACCESS CONTROL METHOD

(75) Inventor: Yoshiaki Uchida, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/371,426

(22) Filed: Aug. 10, 1999

(30) Foreign Application Priority Data

Jan. 19, 1999 (JP) .......................................... 11-010965

(51) Int. Cl.⁷ .............................................. G06F 12/06
(52) U.S. Cl. ........................ 713/202; 711/164; 713/178
(58) Field of Search ................................ 713/200, 202, 713/178; 711/164, 170, 154

(56) References Cited

U.S. PATENT DOCUMENTS

| | | | | |
|---|---|---|---|---|
| 5,719,941 A | * | 2/1998 | Swift et al. ................. | 713/202 |
| 5,734,718 A | * | 3/1998 | Prafullchandra ............ | 713/183 |
| 5,737,422 A | * | 4/1998 | Billings ...................... | 713/159 |
| 5,809,545 A | * | 9/1998 | Ozaki et al. ................. | 711/164 |
| 6,061,799 A | * | 5/2000 | Eldridge et al. ............ | 713/202 |
| 6,219,771 B1 | * | 4/2001 | Kikuchi et al. ............. | 711/164 |
| 6,240,184 B1 | * | 5/2001 | Huynh et al. ............... | 380/206 |
| 6,496,937 B1 | * | 12/2002 | Ichihara ...................... | 713/202 |

FOREIGN PATENT DOCUMENTS

| | | | | |
|---|---|---|---|---|
| JP | 317860 | 1/1991 | | |
| JP | 417160 | 1/1992 | | |
| JP | 581833 | 4/1993 | | |
| JP | 6028579 | 2/1994 | | |
| JP | 6102957 | 4/1994 | | |
| JP | 6103239 | 4/1994 | | |
| JP | 7093241 | 4/1995 | | |
| JP | 8263383 | 10/1996 | | |
| JP | 10097468 | 4/1998 | | |
| JP | 11238010 A | * 8/1999 | .......... | G06F/12/00 |

* cited by examiner

Primary Examiner—Pierre-Michel Bataille
(74) Attorney, Agent, or Firm—Greer, Burns & Crain, Ltd.

(57) ABSTRACT

A storage device is provided for gaining access to a storage medium and for reading data from or writing data to the storage medium. The storage medium has a plurality of access control areas for storing access control areas for storing access control information. The storage device also has an update process unit for performing a current update process and includes new access control information written in to a selected first access control area of the plurality access control areas. The first access control area differs from a second access control area of the plurality of the access control areas. In addition, the storage device also has an access control unit for controlling access to the storage medium depending on correspondence between entered access control information and the new access control information written in the access control area.

16 Claims, 9 Drawing Sheets

| | Zone name | Radius mm | Track No. |
|---|---|---|---|
| | Lead-in Zone | | |
| | Initial Zone | 22.60~23.14 | |
| | Acquire Zone | | |
| | Lead-in tracks | 23.14~23.60 | -434~-93 |
| Medium information management area | Focus tracks | 23.60~23.61 | -88~-85 |
| | Inner Test Zone | | |
| | for manufacturers | 23.61~23.65 | -84~-53 |
| | for drives | 23.65~23.70 | -52~-21 |
| | Inner Control Zone | 23.70~23.72 | -20~-5 |
| | Buffer Zone | 23.72~23.72 | -4~-1 |
| Data area | Data Zone | 23.72~41.00 | 0~18479 |
| | Outer Test Zone | | |
| Medium information management area | for manufacturers | 41.00~41.02 | 18480~18511 |
| | for drives | 41.02~41.06 | 18512~18543 |
| | Buffer Zone | 41.06~41.28 | 18544~18854 |

FIG. 2

| | Zone name | Radius mm | Track No. |
|---|---|---|---|
| | Lead-in Zone | | |
| |   Initial Zone | 22.60~23.14 | |
| | Acquire Zone | | |
| |   Lead-in tracks | 23.14~23.60 | −434~−93 |
| |   Focus tracks | 23.60~23.61 | −88~−85 |
| | Inner Test Zone | | |
| |   for manufacturers | 23.61~23.65 | −84~−53 |
| |   for drives | 23.65~23.70 | −52~−21 |
| | Inner Control Zone | 23.70~23.72 | −20~−5 |
| | Buffer Zone | 23.72~23.72 | −4~−1 |
| | Data Zone | 23.72~41.00 | 0~18479 |
| | Outer Test Zone | | |
| |   for manufacturers | 41.00~41.02 | 18480~18511 |
| |   for drives | 41.02~41.06 | 18512~18543 |
| | Buffer Zone | 41.06~41.28 | 18544~18854 |

Medium information management area

Data area

Medium information management area

Password sector

FIG. 4A

| A | 252 | Password a |
|---|-----|------------|
| B | 253 | Password b |
| C | 254 | Password c | ← Password for comparison
| D | 251 | Password d |

FIG. 4B

| A | 252 | Password a |
|---|-----|------------|
| B | 253 | Password b |
| C | 254 | Password c |
| D | 255 | Password e | ← Password for comparison

FIG. 4C

| A | 252 | Password a |
|---|-----|------------|
| B | 253 | Password b |
| C | 254 | Password c | ← Password for comparison
| D | 255 | Password e |

FIG. 7A

| | | |
|---|---|---|
| A | 251 | Password a |
| B | 252 | Password b |
| C | 253 | Password c |
| D | 254 | Password d |

FIG. 7B

| | | |
|---|---|---|
| A | 255 | Password a |
| B | 0 | Password b |
| C | 1 | Password c |
| D | 254 | Password d |

STORAGE DEVICE AND ACCESS CONTROL METHOD

BACKGROUND OF THE INVENTION

The present invention relates to a storage device used to access a storage medium such as an optical disk, magnetic disk or magneto-optical (MO),disk, in order to read and write data, and more particularly to a storage device for restricting access to a storage medium in order to ensure data security.

A known access control method for preventing theft of data written on a storage medium involves establishing a password for controlling access to the storage medium. A user gains access to the storage medium if the entered password matches the password established for the storage medium.

Referring now to FIG. 9, a flow chart is provided for explaining a known access control. When a user wants to read data from or write data to a storage medium, the user places a request for access to the storage medium on a host device which then sends the request to the storage device holding the storage medium (Step S1). Then, the storage device requests/waits entry of a password from the host device (Step S2). The storage device also reads out a password previously stored in a prescribed area of the storage medium (Step S3). When the user enters a password from the host device (Step S4), the entered password is compared with the password read from the storage medium (Step S5). In Step S6, the storage device allows access to the storage medium when the entered password matches the stored password (Step S7), and denies access to the storage medium when they do not match (Step S8).

During initialization of the storage device and medium, a password is written onto a password area, which is a space on the storage medium reserved for the password. Once a password has been set, it is common practice to periodically change the password in order to ensure security in the event that the password itself is stolen. Thus, an operation for writing a new password onto the storage medium is also required for security purposes.

While writing to a storage medium, however, a write error can occur resulting in an inability to carry out the write operation properly. This can occur when there is a loss of power to the storage device, noise, or the like. It is conceivable that a power failure could occur after the password previously written in the password area has been deleted and before a new password has been written. In such an event, no password would be written in the password area, with the result being that anyone could access the storage medium without restriction.

In addition, where noise occurs during a password write, an abnormal value could be written to the storage medium by mistake. If this occurs, the password would not be written correctly, and since once a password is written, it cannot be read by a user, even an authorized user would not be able to access the storage medium in this case. Furthermore, foreign matter that adheres to the storage medium or a scratch on the storage medium could prevent a password from being read out. Moreover, a power loss, or the like, occurring after a password has been written could prevent the verification process from being carried out properly. In these circumstances, the password write process might not terminate normally so that the password could not be read out from the password area, thus preventing password comparison. When this happens, even an authorized user would not be able to access the storage medium.

OBJECTS OF THE INVENTION

Thus, it is an object of the present invention to provide an improved storage device that can maintain control of access to a storage medium by allowing only authorized users access to the storage medium even when a write error occurs during a password write operation to the password area of the storage medium or a password becomes unreadable.

More specifically, an object of the present invention is to provide an improved storage device that can access a storage medium with a plurality of access control areas for storing access control information such as older passwords so that if the update process fails and it becomes impossible to read access control information from one access control area, access control information from another access control area can still be used to restrict access to the storage medium.

Yet another object of the present invention is to provide an improved storage device that locates and replaces defective sectors.

SUMMARY OF THE INVENTION

In one aspect of the invention, a storage device is provided for gaining access to a storage medium and for reading data from or writing data to the storage medium. The storage medium has a plurality of access control areas it for storing access control information. The storage device has an update process unit for performing a current update and includes new access control information written to a selected first access control area of the plurality of access control areas. The first access control area can be differentiated from a second access control area of the plurality of access control areas. In addition, an access control unit for controlling access to the storage medium depends on correspondence between the entered access control information and the new access control information written in the first access control area.

In another aspect of the present invention, an access control method is provided for gaining access to a storage medium that has a plurality of access control areas for storing access control information. The access control method includes writing new access information to a first access control area of the plurality of access control areas. The first access control area is differentiated from a second access control area of the plurality of access control areas. In addition, the method also includes controlling access to the storage medium depending on correspondence between the entered access control information and the new access control information written in the first access control area.

BRIEF DESCRIPTION OF THE DRAWINGS

Preferred embodiments of the present invention are described herein with reference to the drawings wherein:

FIG. 2 is an example of a disk format layout for a magneto-optical disk in the present invention;

FIGS. 4A, 4B and 4C are diagrams for explaining a password update process in another aspect of the present invention;

FIGS. 7A and 7B are diagrams for explaining steps S22 and S23 of FIG. 6;

DESCRIPTION OF THE PREFERRED EMBODIMENTS

Figure 1:
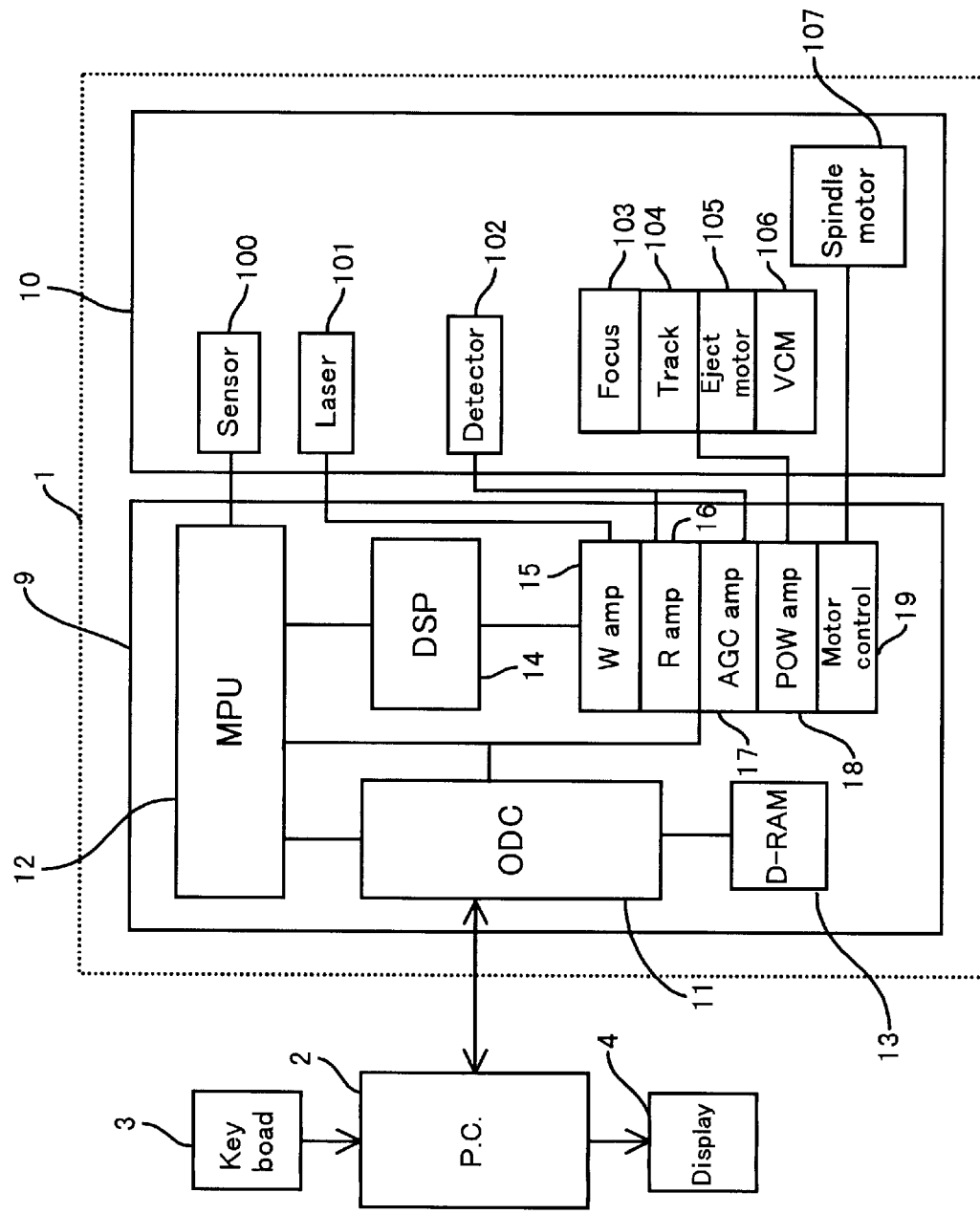
FIG. 1 is a block diagram of a storage device for explaining an aspect of the present invention.

Referring now to FIG. 1, a block diagram of the structure of a recording/reproducing device is provided to show one aspect of the present invention. While the description is based on data storage on a magneto-optical disk (MO), the storage medium is not limited to this type of disk, and may be another type of rewritable storage medium, such as a magnetic disk, floppy disk, optical disk, or phase change type optical disk.

As shown in FIG. 1, a magneto-optical disk device 1 is connected to a personal computer 2 (host device) through a SCSI interface. The magneto-optical disk device 1 has a mechanism control unit 10 for performing write and read operations on the magneto-optical disk, and further comprises a control circuit unit 9 with a magneto-optical disk control unit (Optical Disk Controller, hereinafter "ODC") 11 having firmware programmed to execute the access control method of the present invention. Accordingly, each process for the access control method of the present invention described below is preferably controlled by the ODC 11.

The control circuit unit 9 further has an MPU 12 for overall control of the magneto-optical disk device 1, DRAM 13 serving as buffer memory for reads/writes, a DSP 14 for controlling positioning, a write data amplifier circuit 15, a read data amplifier circuit 16, an AGC amplifier circuit 17, a head drive power amplification circuit 18, and a disk rotating motor control circuit 19.

The mechanism control unit 10 has a head sensor 100, a data read/write laser diode 101, and a detector 102 for detecting head tilt and the like. The mechanism control unit 10 further has a focus actuator circuit 103 controlled by the head drive power amplification circuit 18, a track actuator circuit 104, a disk removal (eject) motor 105 and a head drive voice coil motor 106. A spindle motor 107 in the mechanism control unit 10 is rotationally controlled by the motor control circuit 19 for rotating a disk (not shown).

In response to an instruction entered by a user from the keyboard 3 of the personal computer 2, a command is sent from the computer 2 to the magneto-optical disk control unit (ODC) 11 and data read/write control is performed. The computer 2 is also connected to a display 4 for displaying write data and read data.

The ODC 11 has firmware composed of flash ROM and has the function of analyzing commands received from the computer 2. It also has the function of performing write/read control with respect to the mechanism control unit 10, operating in cooperation with the MPU 12 in response to commands.

Referring now to FIG. 2, a chart shows the components of a disk format for a magneto-optical (MO) disk. The MO disk contains memory areas for complying with ISO standards for 3.5-inch magneto-optical disk cartridges. As shown in FIG. 2, the range from radius 23.72 mm to radius 41.00 mm from the center of the disk is a user area for writing data called a data zone. The areas outside of the data zone in the radial direction of the disk, both closer to and farther from the center of the disk, are medium information management areas for storing various types of medium information such as the type and make of the medium. As shown in FIG. 2, this may include a lead-in zone having an initial zone, an acquire zone having lead-in tracks and focus tracks, inner and outer test zones with separate areas for manufacturers and drives, an inner control zone, and buffer zones on either side of the data zone. Of course, many other possibilities are contemplated.

Figure 3A:
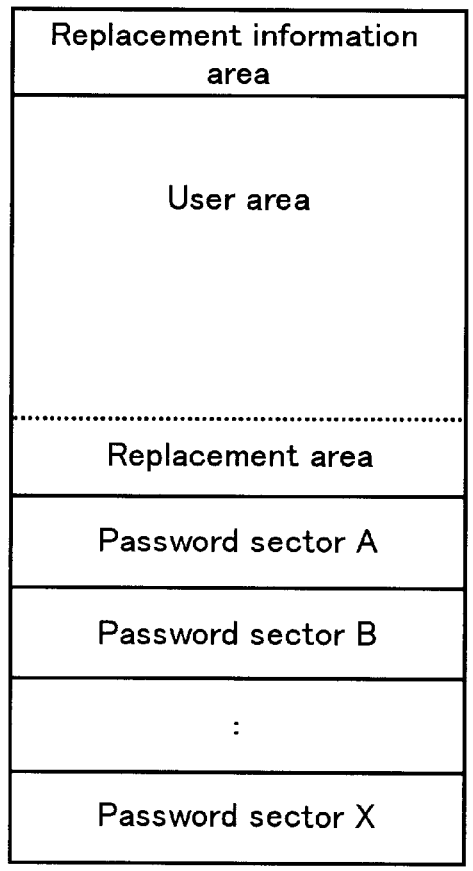
FIGS. 3A and 3B are diagrams depicting password sectors used in the present invention.
Figure 3B:
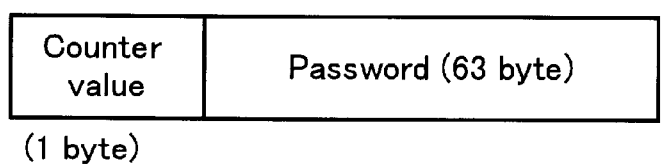

In an aspect of the present invention, passwords are written to a prescribed area in this medium information management area which is provided with a plurality of password sectors serving as access control areas. Referring now to FIGS. 3A and 3B, a diagram depicts typical password sectors for the present invention. According to FIG. 3A, a plurality of password sectors A, B . . . X are provided in one of the medium information management areas. As shown in FIG. 3B, each password sector preferably includes a space for a one-byte counter value which represents update order information indicating the order of updates and space for a 63-byte password.

In addition, the user area preferably has a replacement area reserved for storing data when the user area has a defective section. A replacement information area is also preferably provided outside of the user area and is reserved for storing the address of the defective section and the address of the corresponding replacement area.

With this configuration, a plurality of password sectors are provided, and each update process updates one of the password sectors. Accordingly, when passwords are updated at different times, the new passwords are stored in the plurality of password sectors at different times. In the preferred embodiment, the password sector with a password that has been stored in a sector longer than any other password has been stored in any other section is the sector that is updated during a current update process. This password sector is called the earliest updated sector with the oldest password or the "oldest-updated password sector." The password used for ordinary access control is then the password in the most recently updated password sector.

Referring now to FIGS. 4A, 4B and 4C, a diagram explains a password update process on one of the password sectors. The process explained in FIGS. 4A, 4B and 4C uses four password sectors although other quantities of sectors are contemplated. First, FIG. 4A shows the passwords a to d stored in the password sectors A, B, C, and D, respectively, prior to starting the update process. In the preferred embodiment, the counter value is provided by a single byte, represented by numbers 0 to 255. In this embodiment, for example, the counter values in password sectors A, B, C, and D are "252 ," "253 ," "254," and "251," respectively. The counter value sequentially and numerically counts in the updating order. That is, the counter value to be stored in the next password sector to be updated is obtained by adding one to the counter value of the password sector that was most recently updated. The number added is not limited to one, and may be a larger number.

Thus, as shown in FIG. 4A, password sector C has the most recently updated password sector. Password sector D was the first or earliest of the four sectors shown to be updated, and therefore has the oldest password. Accordingly, in this condition prior to the current update process, the password in password sector C, the most recently updated sector, is used for access control.

Referring now to FIG. 4B, a diagram shows the sectors after the current update process. As depicted, when a password update process is carried out, password sector D, with the oldest password, is updated. For example, during the update process, the old password d in password sector D is replaced with new password e, and the counter value in password sector D is assigned the number "255," the result of adding one to the most recent counter value, "254." Accordingly, after this update process, password sector D becomes the most recently updated sector and password e is used for access control.

Referring now to FIG. 4C, a diagram shows the sectors after a sample update process when the ODC 11 cannot read data (i.e., cannot read count 255, password e) from password sector D. This may occur, for instance, when data existing in sector D prior to the update process was deleted. When this happens, the update process cannot be carried out normally since the new counter value (256 or 0) and new password data (password f) cannot be written to password sector C. In other words, if a previous password write operation does not terminate normally, the subsequent password write operation cannot be carried out normally. In such an event, the password in the most recently updated password sector that can be read normally by the ODC 11 is used for access control. In this example, since password c from password sector C can be read, and since password c was being used just prior to the current update process, it is now used for access control.

Ordinarily, password e and password c are different. However, password c is also a value previously specified by the user himself. Accordingly, even in the event that password e cannot be used for password comparison, the use of password c for password comparison allows a determination to be made as to whether or not the storage medium access requester is an authorized user or not. In this way, according to one of the aspects of the present invention, the password prior to an update process is retained so that even in the event that the password update process fails, the previous password can be used for password comparison, thereby ensuring security.

Figure 5:
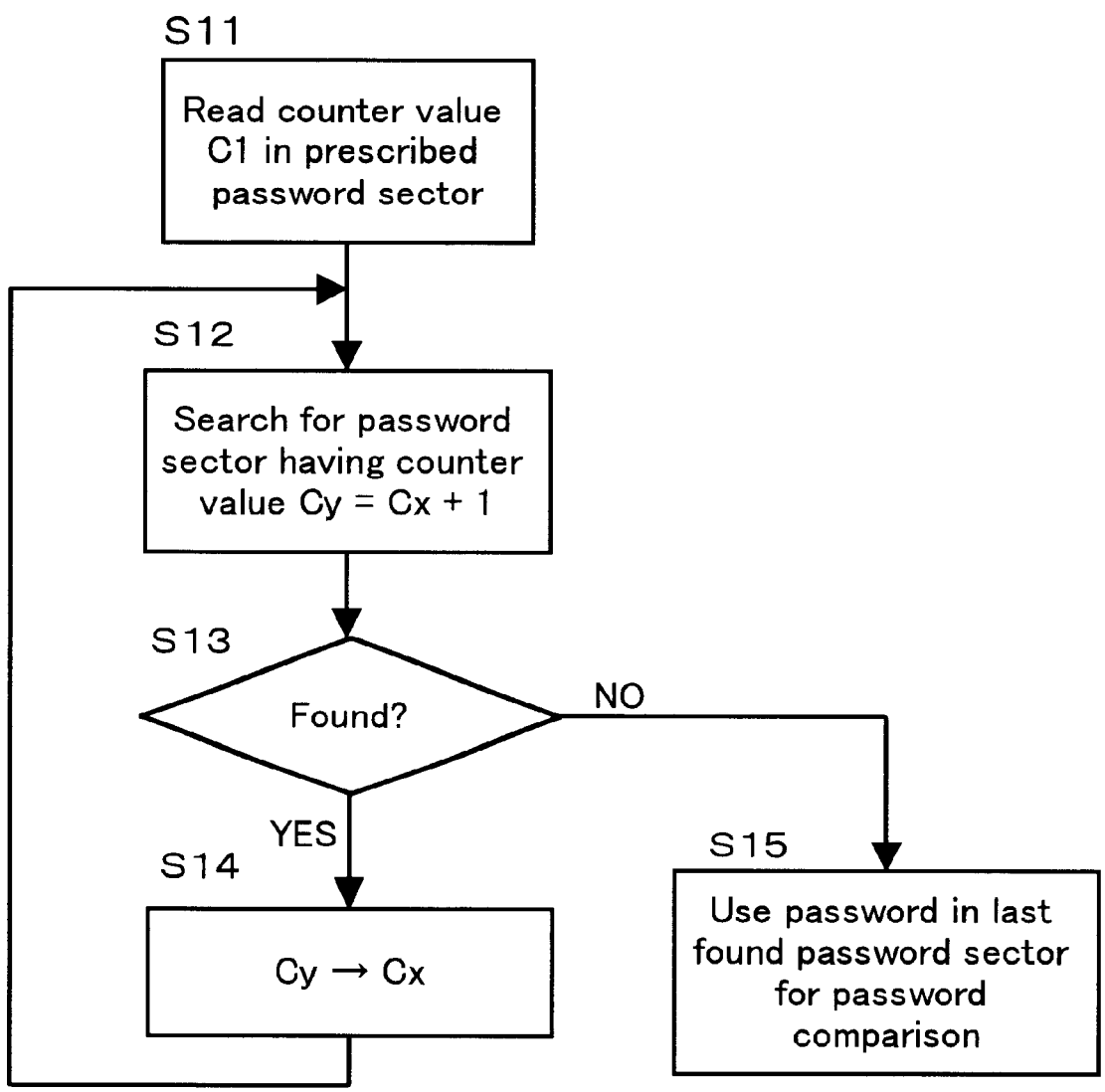
FIG. 5 is a flow chart for determining the password to be used for access control.

Referring now to FIG. 5, a flow chart is provided to explain how the ODC 11 decides which password sector and password should be used for comparisons or access control. All of the following process steps are preferably executed by the ODC 11 in FIG. 1. First, in Step S 11 the ODC 11 reads out the counter value C 1 from a pre-established password sector (password sector A, for example) from among the plurality of password sectors. Next, in Step S12, the ODC 11 searches for a password sector having a counter value Cy, where Cy=Cx+1. C1 is the initial value of Cx.

Then, in Step S13, it is determined whether or not a password sector having the counter value Cy is found. If counter value Cy is found, the process proceeds to Step S14 where Cy is set as a new counter value Cx, and the process returns to Step S12 to search for a new counter value Cy. In other words, the ODC 11 searches for a password sector having a new counter value Cy equivalent to new counter value Cx+1. A loop containing Steps S12 to S14 is repeated until the ODC 11 can no longer find a counter value Cy. If a counter value Cy is not found in Step S13, in Step S15 the password of the most recently found password sector is determined to be the password used for password comparison.

For example, in FIG. 4A, using the counter value "252" in password sector A as the initial value C1 (Cx), the ODC 11 first searches for a password sector having the counter value "253" (Cy) (Step S12). When a password sector B having the counter value "253" is found (Step S13), the counter value "253" is designated as new Cx (Step S14), and a search is resumed for a password sector having the new Cy counter value "254." When a password sector C having the counter value "254" is found, the ODC 11 designates the counter value "254" as Cx, and searches for a password sector having the counter value "255." However, since there is no password sector having the counter value "255," the ODC 11 determines the password in password sector C having the counter value "254" to be the password for use in password comparison.

In FIG. 4B, under the aforementioned scenario of FIG. 4A, a password sector D having a counter value "255" is found. When the counter value reaches its maximum value of "255," it returns to the minimum value of "0." So the ODC 11 then searches for a password sector having the next counter value "0" (zero). Accordingly, the number of possible values for the counter value (256 in the case of one byte, for example) must be sufficiently greater (2 to 3 times greater) than the number of password sectors (four, for example). Since there is no password sector having the counter value "0" in FIG. 4B, the ODC 11 determines the password of password sector D as that for use in password comparison.

In FIG. 4C, as explained previously, data cannot be read from password sector D even though the most recent update process was performed on password sector D. As a result, in a manner analogous to FIG. 4A, the ODC 11 determines that password c from password sector C should be used for access control, which was the password in effect prior to the latest update process.

Figure 6:
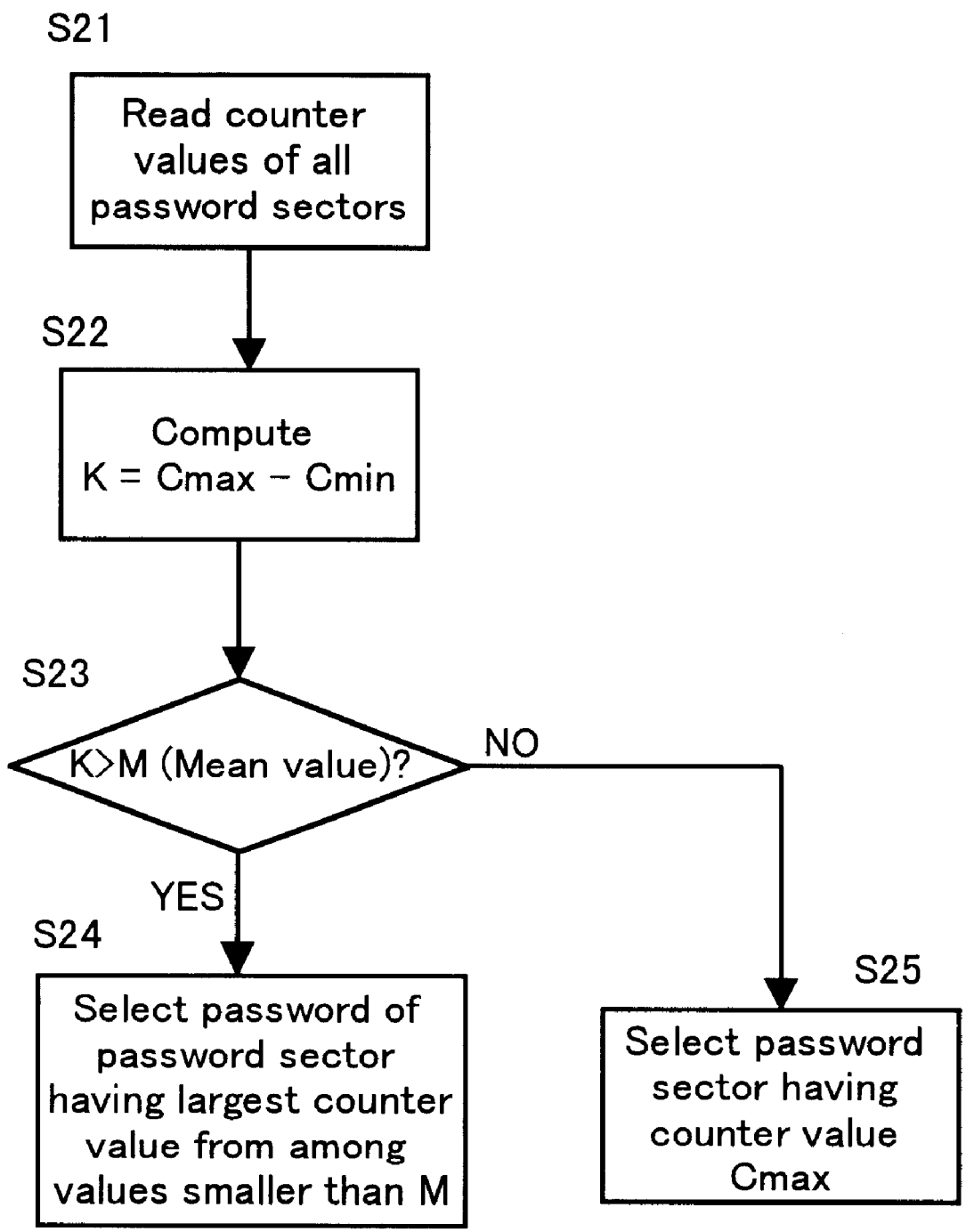
FIG. 6 is another flow chart for determining the password to be used for access control.

Referring now to FIG. 6, a flow chart is provided to explain another way of determining which password should be used for access control. In Step S21, the ODC 11 reads out counter values from all password sectors. Then, in Step S22, a value K is computed by subtracting the smallest value Cmin from the greatest value Cmax among the counter values read out. In Step S23, this value K is compared with the mean value M of Cmax, the maximum value that the counter can assume. Thus, in this example, M is 128 for a maximum value of 255, or 225 when 8 bits are used.

Referring now to FIGS. 7A and 7B, a diagram is provided to explain steps S22 and S23. When counter values in a plurality of password sectors are sequential, as shown in FIG. 7A, the greatest value among them ("254" in FIG. 7A) represents the counter value of the most recently updated password sector. Moreover, once the count value reaches its maximum value of 255, it returns to the minimum value of 0. Accordingly, it is possible that both count values close to the maximum value and count values close to the minimum value are present in a plurality of password sectors at the same time, as shown in FIG. 7B. In such an event, the greatest value ("1" in FIG. 7B) among the counter values close to the minimum value ("0" and "1" in FIG. 7B) would be the counter value for the most recently updated password sector.

In the case depicted in FIG. 7A, when the smallest value is subtracted from the greatest value among the counter values that have been read, the subtracted value will be equivalent to the number of password sectors n minus 1 (here 3), and will be sufficiently smaller than the mean value(128).

On the other hand, in the case depicted in FIG. 7B, the value from subtracting minimum value Cmin from maximum value Cmax is a much larger value than the mean value mentioned above. In this way, the ODC 11 can determine if sectors are numbered as in FIG. 7A or FIG. 7B. The mean value M need not be strictly limited to the actual mean value, provided that it is a value greater than the number of password sectors n−1 and smaller than Cmax(n+1), for example.

Next m Step S23 the ODC 11 determines whether or not K is greater than M. For the case depicted in FIG. 7B, since K=255 and M=128, the ODC 11 proceeds to Step S24. Here, the ODC 11 selects password sector C as having the largest counter value (i.e., "1") among those counter values smaller than 128, the value of M (i.e., "0" or "1"). On the other hand, if K is smaller than the mean value M, such as in FIG. 7A where K=3 and M=128, the ODC 11 selects password sector D as having the counter value Cmax (Step S25).

Figure 8:
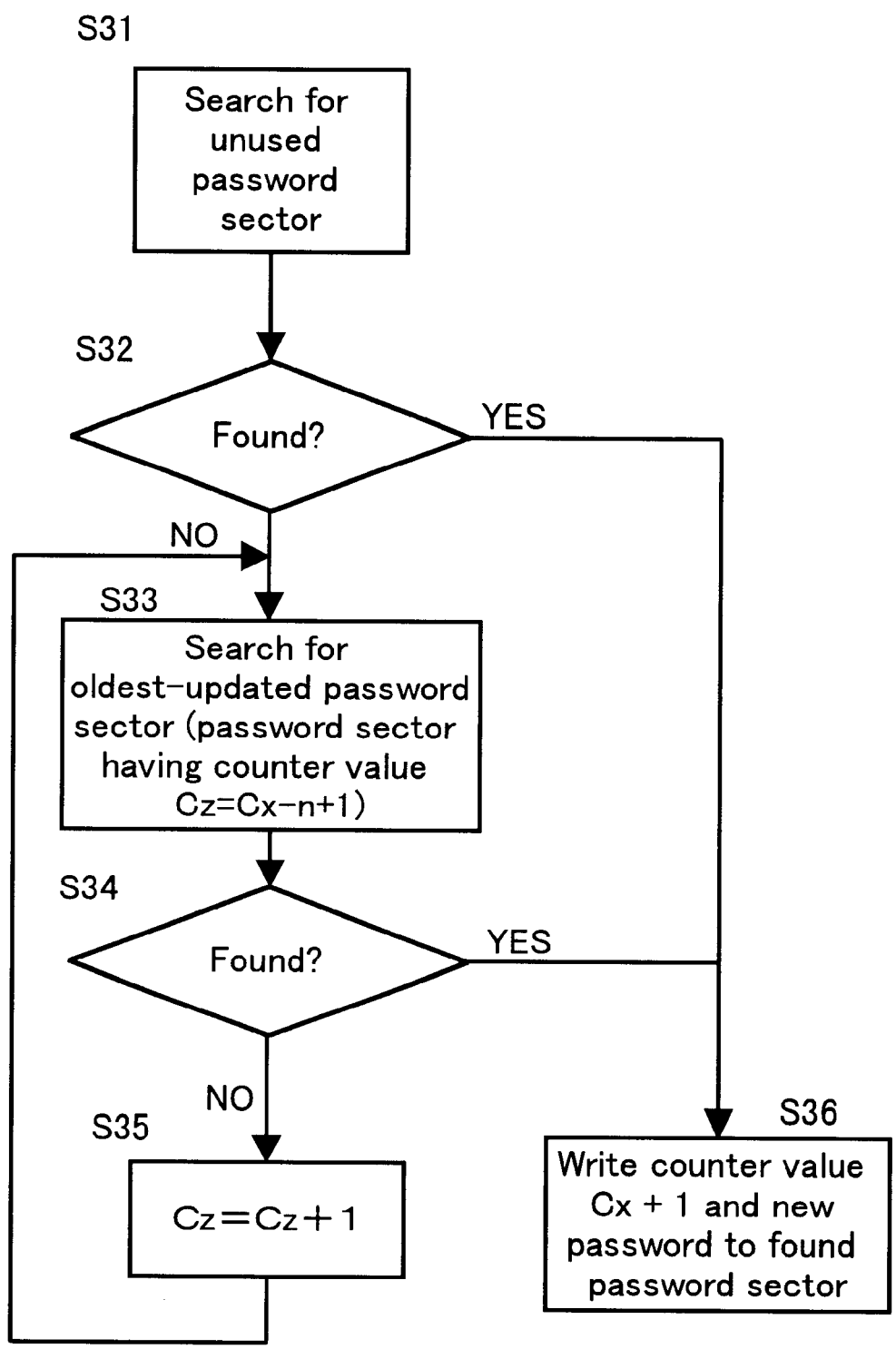
FIG. 8 is a flowchart for the password update process in yet another aspect of the present invention.
Figure 9:
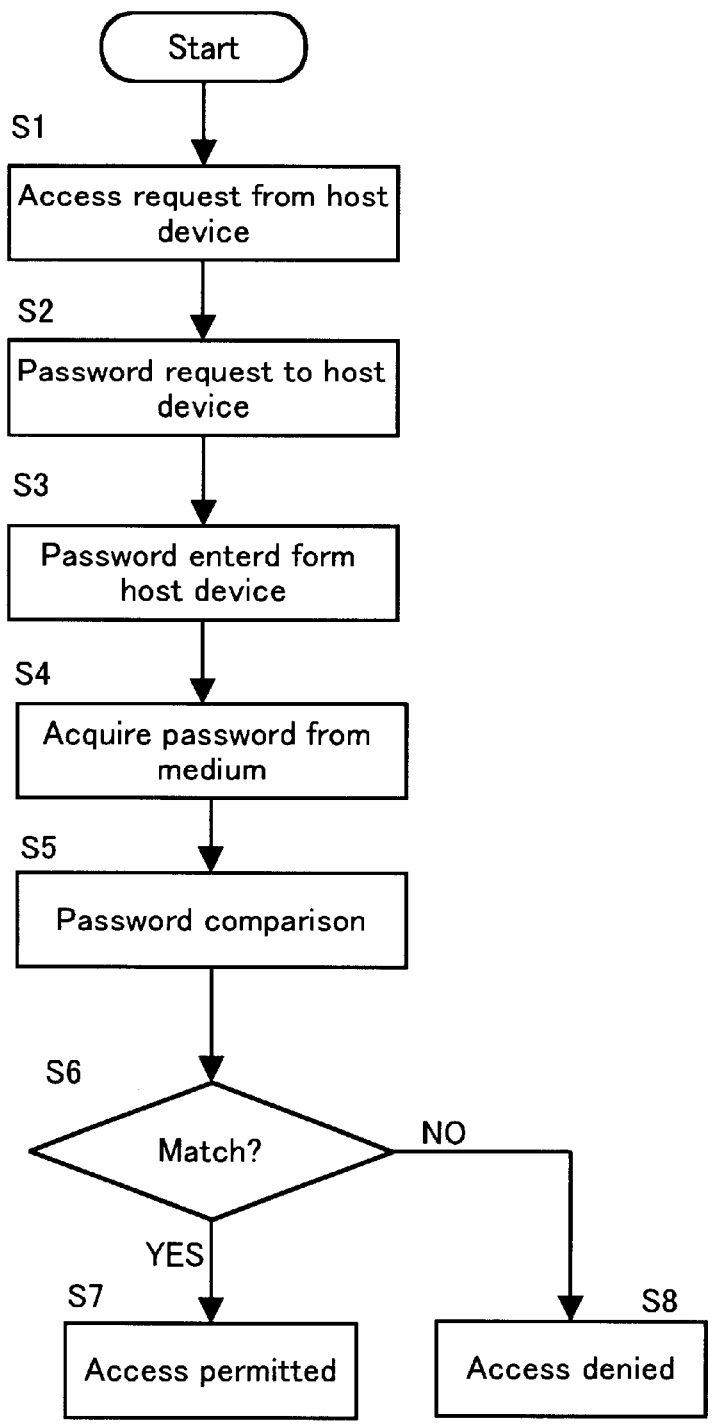
FIG. 9 is a flow chart for explaining conventional access control.

Referring now to FIG. 8, a flowchart is provided to explain the password update process of yet another aspect of the present invention. First, in Step S31, the ODC 11 searches for an unused password sector. It is sufficient to search for a password sector in which all password areas in the password sector are "0" (zero). In Step S32, once an unused password sector is found, the process proceeds to Step S36, and the updated password is written to the unused password sector. However, if an unused password sector is not found in Step S32 the process proceeds to Step S33. In this step, a counter value Cx is obtained from the password sector with the password that is used for password comparison in accordance with the flowchart of FIG. 5 or FIG. 6. Then the ODC 11 searches for a password sector having counter value Cz where Cz=Cx−n+1, and where n denotes the total number of password sectors. The password sector having a counter value Cz will be the password sector with the oldest password. For example for FIG. 4A, sector C is used for comparison, so 254 is Cx. Thus, Cz=254−4+1=251.

In Step S34, once a password sector having the counter value Cz is found, the process proceeds to Step S36, and the updated password is written to the password sector in the manner described previously. Thus, the ODC 11 writes a counter value Cx+1 and a new password to the unused password sector that will be updated.

In some cases, a counter value Cz will not be found in Step S34. This may occur when the password sector counter value Cx computed in Step S32 is not the counter value of the most recently updated password sector but is the counter value of a password sector updated previously. In such a case, computing the counter value Cz using the equation given earlier will give a counter value Cz that is nonexistent. Accordingly, counter value Cz will not be found.

In such a case, in Step S35, a value equivalent to the counter value Cz+1 is now used as the counter value Cz, and the process returns to Step S33. By repeating this loop it is possible to find the password sector with the earliest updated sector with the oldest password.

When the ODC 11 is writing a new password and counter value to the found password sector in Step S36, if the write process fails, typically, a retry process is performed at least once. If the retry process is unsuccessful, an error message is sent to the host device. This notifies the user that the update process was not completed normally. As noted earlier, when a password update process has failed, the previously updated password is used for password comparison. Thus, when the user enters the previous password rather than the new password in order to access the storage medium, the passwords will match, making it possible to access the storage medium.

Sometimes, the user may not be aware that an older password, entered before the current update process, is being used for password comparison. An example would be when, despite the update process having been completed normally, foreign matter adheres to the most recently updated password sector area or a scratch in this area has subsequently made it impossible to read therefrom. Thus, if a user enters the newest password in the usual manner, the passwords will not match, and access will be denied. In such an event, the user will, by trial and error, re-enter the password used prior to the most recent update, the passwords will match, and access to the storage medium will be enabled.

In the write operation of Step S36 shown in FIG. 8, the found password sector may be a defective password sector that cannot be written to. In such a case, a replacement sector may be assigned to the defective password sector. The replacement sector may be provided in the medium management information area in FIG. 2, or in the replacement area of the user area (see FIG. 3). When a new counter value and new password are written to the replacement sector, replacement information indicating the address of the defective password sector and the address of the corresponding replacement sector are stored in the replacement information area, as shown in FIG. 3.

By acquiring this replacement information prior to reading data from a password sector, the ODC 11 can read out the counter value and password from the replacement sector rather than try to retrieve them from the defective password sector.

Alternatively, during the password update process shown in FIG. 8, if the ODC 11 finds a defective password sector with an unreadable counter value during the search for the password sector to update (Step S33), the ODC 11 may select the damaged password sector as the password sector to update. The ODC 11 then can attempt to write a counter value and a new password to the defective password sector. If the write operation fails, since the aforementioned replacement sector has already been assigned, the number of password sectors can be restored.

In addition, it is possible that the most recently updated password sector became defective during use, and when a password update is performed, the counter value cannot be read from the defective sector. When this occurs, the ODC 11 will recognize the next-latest counter value as the newest counter value. Under such a condition, the counter value in the selected password sector will be updated to the old counter value+1, resulting in a condition in which identical counter values are present in a plurality of password sectors.

If the most recently updated password sector remains defective and cannot be read, this presents no problem. However, if the defective sector should become readable when the storage medium is used in another storage device, for example, the ODC 11 will no longer be able to determine which password sector has the password that should be used for password comparison. To avoid this inconvenience, a number equal to the counter value in the selected password sector plus 1 plus the number m of unreadable defective password sectors can be used as the counter value that is set in the password sector (i.e., the new counter value is the selected counter value+1+m).

Although the present invention was described above using a password, ID data identifying a user or other type of updatable access control information could be used as well. In addition, as another alternative, the plurality of password sectors in an aspect of the present invention may be provided in contiguous areas on the medium, or in separate areas. Furthermore, the access control method of the present invention may be executed under control of the CPU of the personal computer which is the host device, rather than by the ODC 11.

Moreover, the present invention is not limited to only updating the earliest updated sector with the oldest password prior to the current update process. Thus, the update process can be conducted on any sector other than the sector most recently updated prior to the current update process.

Further, when passwords are written to more than one sector, the update process may be conducted on any other of these sectors. Thus, it is conceivable that an update process could be performed on the sector most recently updated prior to the current update process. When this occurs, however, an old password written before the most recently completed update process and the current update process would be used as the password for performing the password comparison while updating the recently updated password. Of course, when only one sector from among a plurality of password sectors contains a password, the current update process must be performed on a sector other than the sector that has the password.

According to the present invention, a storage medium is provided with a plurality of password sectors, and passwords updated at different times are respectively written thereto. When a password update process is performed, the password update process is preferably performed on the password sector with the oldest password, so that if the password update process fails, the password used just prior to commencing the update process is stored in another password sector and is used as the password for password comparisons.

Thus, regardless of the circumstances, a password only known to authorized users is stored as the effective password, and data security is maintained. Moreover, a user can still gain access to a storage medium even though a password update process failed resulting in an inability to read the password. Further, since the password system always has a password to use, unauthorized users never have access to the storage device.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed:

1. A storage device for gaining access to a storage medium and for reading data from or writing data to the storage medium, the storage medium having a plurality of access control areas for storing access control information, the storage device comprising:

an update process unit for performing a current update process and writing new access control information in a first access control area of the plurality of access control areas, said update process unit being able to select said first access control area being different from a second access control area where a last access control information is written; and an access control unit for controlling access to the storage medium depending on correspondence between entered access control information and said new access control information written in said first access control area instead of said last access control information written in said second access control area after said current update process, wherein the plurality of access control areas have update state information indicating the respective state that said access control information was updated in said plurality of access control areas, said update state information indicating at least one of a newest and an oldest of said access control information, and wherein said update process unit further determines which access control area is said first access control area and which is said second access control area depending on said update state information.

2. The storage device according to claim 1, wherein said second access control area is an area that was most recently updated before said current update process.

3. The storage device according to claim 1, wherein when said first access control area cannot be read, access control unit selects an access control area other than said first access control area and controls access to the storage medium depending on correspondence between access control information written in the selected access control area and entered access control information.

4. The storage device according to claim 3, wherein the selected access control area is the last-updated access control area of a plurality of access control areas that can be read by said access control unit.

5. The storage device according to claim 1, wherein the update state information is a counter value that is incremented by a prescribed numerical value during each update process.

6. The storage device according to claim 5, wherein the update state information has a maximum value and then restarts counting at zero, and said first and second access control areas are determined by using a mean value of a plurality of possible counter values.

7. The storage device according to claim 1, wherein the access control information is a password.

8. The storage device according to claim 1, wherein said update process unit assigns a replacement area on said storage medium and assigns a replacement information area for storing the address of the replacement area when said update process unit finds that one of said access control areas is defective.

9. An access control method for accessing a storage medium having a plurality of access control areas for storing access control information, comprising the steps of:

writing new access control information to a first access control area of the plurality of access control areas so that said first access control area can be differentiated from a second access control area of said plurality of access control areas;

controlling access to the storage medium depending on correspondence between entered access control information and said new access control information written in said first access control area; and setting update state information indicating the respective state of update processes in each said access control area, and selecting said first and second access area control areas depending on said update state information said update state information indicating at least one of a newest and an oldest of said access control information.

10. The access control method according to claim 9, further comprising the step of setting an area that was most recently updated before said current update process as said second access control area.

11. The access control method according to claim 10, further comprising the steps of:

when the most recently updated access control area cannot be read, selecting an access control area other than the most recently updated access control area to be set as said second access control area; and controlling access to the storage medium depending on correspondence between the access control information written in said second access control area and said entered access control information before completion of said current update.

12. The access control method according to claim 11, further comprising the step of selecting the last updated access control area of a plurality of access control areas that can be read by the access control unit as said second access control area.

13. The access control method according to claim 9, further comprising the step of setting a counter value that is incremented by a prescribed numerical value during each update process as said update state information.

14. The access control method according to claim 13, further comprising the step of restarting the counter values at zero or one when a maximum counter value is reached, and determining which areas are said first and second access control area by using a mean value of a plurality of possible counter values.

15. The access control method according to claim 9, further comprising the step of setting password as said access control information.

16. The access control method according to claim 9, further comprising the step of assigning a replacement area and a replacement information area to store the address of the replacement area when an access control area is found to be defective.

* * * * *

UNITED STATES PATENT AND TRADEMARK OFFICE
CERTIFICATE OF CORRECTION

PATENT NO.    : 6,738,913 B1
DATED         : May 18, 2004
INVENTOR(S)   : Yoshiaki Uchida It is certified that error appears in the above-identified patent and that said Letters Patent is hereby corrected as shown below:

<u>Column 10,</u>
Line 3, between "indicating" and "a newest" please delete "at least one of" therefor.
Lines 57-58, between "indicating" and "a newest" please delete "at least one of" therefor.

Signed and Sealed this

Nineteenth Day of October, 2004

JON W. DUDAS
*Director of the United States Patent and Trademark Office*